United States Patent [19]

Hirata et al.

[11] Patent Number: 5,150,365
[45] Date of Patent: Sep. 22, 1992

[54] COMMUNICATION SYSTEM FOR COEXISTENT BASE BAND AND BROAD BAND SIGNALS

[75] Inventors: Tetsuhiko Hirata, Kawasaki; Kazuo Yagyu, Atsugi; Matsuaki Terada, Machida; Hiroshi Nakase, Fujisawa; Shigeru Oshima, Hadano; Motoyoshi Morito, Saitama; Takahiko Nishizawa, Satte, all of Japan

[73] Assignees: Hitachi, Ltd.; Yagi Antenna Co., Ltd., Tokyo, Japan

[21] Appl. No.: 548,431

[22] Filed: Jul. 5, 1990

Related U.S. Application Data

[63] Continuation of Ser. No. 122,303, Nov. 18, 1987, abandoned.

[30] Foreign Application Priority Data

Nov. 18, 1986 [JP] Japan .................. 61-274423

[51] Int. Cl.⁵ .................. H04J 1/02
[52] U.S. Cl. .................. 370/123; 370/72; 370/76
[58] Field of Search .......... 370/30, 69.1, 120, 123, 370/71, 72, 76, 110.1, 110.4, 111, 118; 375/1, 8, 17, 23, 122

[56] References Cited

U.S. PATENT DOCUMENTS

| | | | |
|---|---|---|---|
| 3,586,781 | 6/1971 | Jones | 370/111 |
| 3,601,544 | 8/1971 | Murphy | 375/17 |
| 3,875,339 | 4/1975 | Gruen et al. | 370/76 |
| 4,347,619 | 8/1982 | Dakin et al. | 375/17 |
| 4,377,860 | 3/1983 | Godbole | 370/111 |
| 4,402,076 | 8/1983 | Krajewski | 370/120 |
| 4,430,731 | 2/1984 | Gimple et al. | 370/30 |
| 4,443,662 | 4/1984 | Nakhla | 370/76 |
| 4,512,025 | 4/1985 | Frankel et al. | 370/71 |
| 4,521,881 | 6/1985 | Stapleford et al. | 370/72 |
| 4,757,495 | 7/1988 | Decker et al. | 370/76 |
| 4,849,811 | 7/1989 | Kleinerman | 370/76 |

FOREIGN PATENT DOCUMENTS 56-56053  5/1981  Japan ................ 370/72

OTHER PUBLICATIONS

A. Sabato et al., "A System of Broad Band Network and its Applications", a study meeting held by The Institute of Electrical Engineers of Japan (Document Data No. IP-83-3).

Transmission Systems for Communications, Bell Labs (Text), 1970, pp. 133–136.

Primary Examiner—Douglas W. Olms
Assistant Examiner—Alpus H. Hsu
Attorney, Agent, or Firm—Pennie & Edmonds

[57] ABSTRACT

A base-band and broad-band coexisting communication system comprises a transmission path, a plurality of first data terminal units outputting data to be transmitted in the form of pulse signals (base band signals), a plurality of second data terminal units for outputting data to be transmitted in the form of modulated signals (broad band signals) each having a center frequency within a predetermined frequency range, and a plurality of low-pass filters, each connected to each of the first data transmission units, for cutting off high frequency components of the base band signal outputted by the first data terminal device at a predetermined cut-off frequency which does not overlap with the broad band signals.

8 Claims, 6 Drawing Sheets

COMMUNICATION SYSTEM FOR COEXISTENT BASE BAND AND BROAD BAND SIGNALS

This is a continuation of application Ser. No. 07/122,303, filed Nov. 18, 1987, now abandoned.

BACKGROUND OF THE INVENTION

The present invention generally relates to a communication system. More particularly, this invention is concerned with a multi-medium communication system in which a plurality of different type terminal equipments or units are connected to a single transmission path and which system is employed for transmission of a plurality of various types of information such as computer data, video signal, audio signal and others over a single transmission path.

The communication system using a transmission line or path is globally classified into a base band communication system in which a pulse signal corresponding to a sequence of digital codes "1" and "0" is transmitted over a transmission path on one hand and a broad band communication in which a frequency band on the transmission path is divided into a plurality of frequency ranges (channels), wherein a single transmission path is shared in use for transmission of a plurality of modulated signals (analog signals) having respective center frequencies corresponding to the individual channels. The broad band communication system is suited for the multi-medium communication for transmitting concurrently different types of information such as audio and video information by virtue of the capability of establishing a plurality of logic channels on a single transmission path.

As one of the utilization mode of the broad band communication system, there has been reported a communication system in which information of a base band network is accommodated in one of channels of a broad band network. In this connection, reference may be made to A. Sabato et al's paper entitled "A System of Broad Band Network and its Applications" presented on a study meeting held by The Institute of Electrical Engineers of Japan (Document Data No. IP-83-3). According to this proposal, the digital signal of the base band is once modulated to an analog signal having a predetermined carrier frequency through frequency modulation or phase modulation and thereafter sent out onto a transmission path of the broad band network. This known system is however disadvantageous in that all the terminal units or devices handling the base band signal require respective high frequency modems for modulation/demodulation of the digital signal to/from the broad band signal (analogue signal) and involve necessarily complicated structure of the terminal unit. Beside, the known system can not always be applied to all the existing base band systems.

SUMMARY OF THE INVENTION

It is therefore an object of the present invention to provide a communication system capable of performing both of base band and broad band communications by using a single transmission path.

In view of the above object, there is proposed according to an aspect of the present invention a communication system which comprises a transmission path, at least one first terminal unit outputting information to be transmitted in the form of a base band signal, at least one low-pass filter means having a predetermined cut-off frequency to serve for connecting the transmission path and the first terminal unit to each other, at least one second terminal unit for transmitting and/or receiving to and/or from the transmission path the signal modulated to a signal of a predetermined frequency range which is higher than the abovementioned cut-off frequency of the low-pass filter means, and at least one connecting means for connecting the second terminal unit and the transmission path to each other.

With the phrase "second terminal unit or device", it is intended to cover a data terminal unit imparted with modulation/demodulation (MODEM) functions, television (TV) equipment for receiving video signal through a transmission line or the like which perform the broad band communication in a frequency band higher than the above mentioned cut-off frequency. On the other hand, the first terminal units are adapted to perform the base band communication in a frequency band not higher than the broad band frequency without using the modem unit.

The foregoing and other objects, advantages, manner of operation and novel features of the present invention will be understood from the following detailed description when read in connection with the accompanying drawings.

DESCRIPTION OF THE PREFERRED EMBODIMENTS

Figure 1:
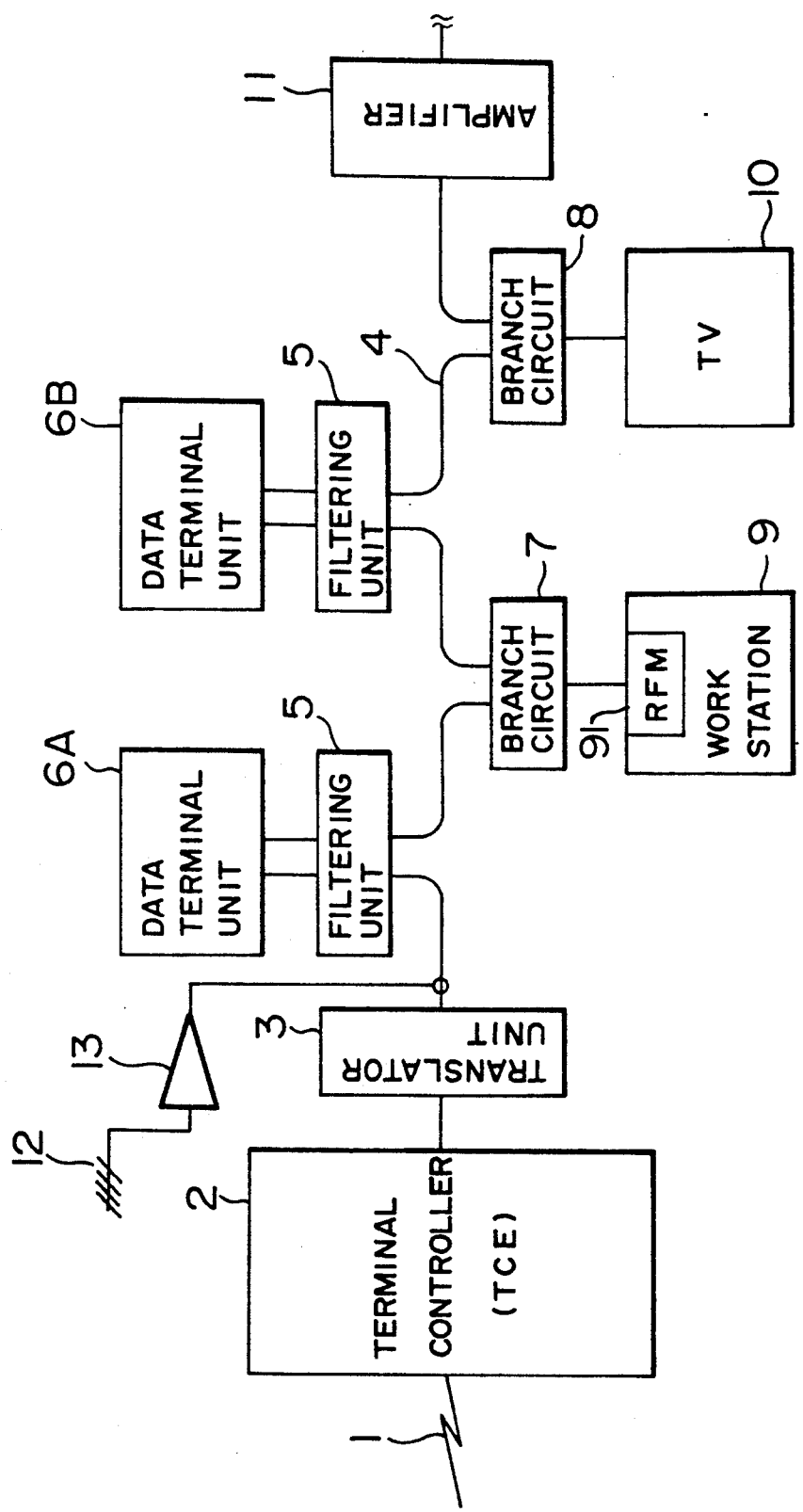
FIG. 1 is a view showing a general arrangement of a communication network according to an exemplary embodiment of the present invention.

FIG. 1 shows in a block diagram a general arrangement of a communication network according to an exemplary embodiment of the present invention. In the figure, a reference numeral 1 denotes a communication network connected to a computer or LAN (abbreviation of Local Area Network) of higher hierarchical rank (both not shown) which is disposed at a location upstream of the network under consideration. A numeral 2 denotes a terminal controller (hereinafter referred to as TCE in abbreviation) connected between the communication line 1 and the network for serving as an interface to the latter. A numeral 3 denotes a translator unit (hereinafter also referred to as TU) for translating an incoming broad band signal transmitted along a transmission path (coaxial cable) 4 and having a center frequency $f_1$ to a broad band signal having a center frequency $f_2$ and sending back the latter to the above-mentioned transmission path. Reference characters 6A and 6B denote, respectively, data terminal units for processing digital signals, each of which is connected to the transmission path 4 through a respective filtering unit (referred to EU) 5. A numeral 9 denotes a terminal unit (work station) equipped with an RF modem (RFM) 91 for converting a digital signal to an analog signal of a predetermined frequency. This terminal unit or work station 9 is connected to the transmission path 4 by way of a branch circuit 7. A numeral 10 denotes a television (TV) unit which is also connected to the transmission path 4 through a branch circuit 8. A numeral 11 denotes a bi-directional amplifier which is inserted in the transmission path 4 in case the latter is of a great length. A numeral 12 denotes a TV antenna and 13 denotes an amplifier for amplifying video signal received by the TV antenna, the amplified signal being then sent onto the transmission path 4. It should here be mentioned that pluralities of the work stations 9 and TVs 10 are provided along the transmission path 4 in practical applications, although not shown in detail. As will be seen, the network shown in FIG. 1 can be regarded to be of such a structure in which the broad band communication network composed of the work station 9 and the TV 10 is additionally provided with the data terminal units 6A and 6B and the terminal controller or TCE 2 both of a base band.

Figure 2:
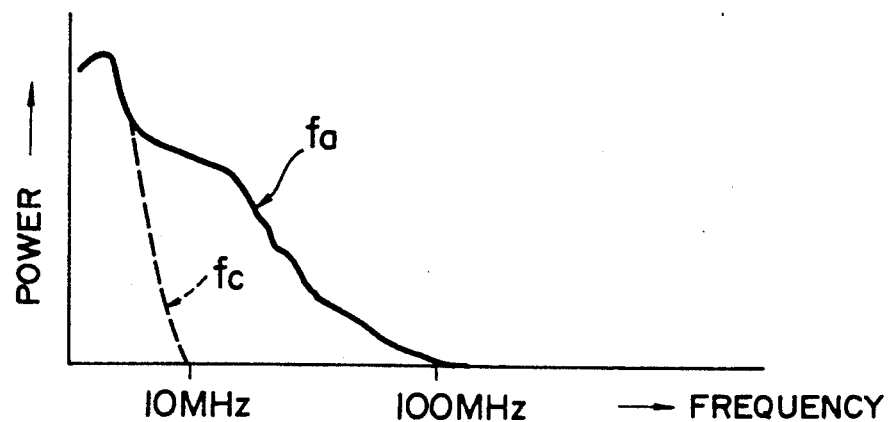
FIG. 2 is a view showing frequency spectrum of a base band signal.

When the digital signal (pulse signal) produced by the data terminal unit 6 (a general notation of 6A, 6B) are sent onto the transmission path 4 through the conventional coaxial interface having a base band of 1M bps, the frequency spectrum exhibits a spread not smaller than 100 MHz, as indicated by a solid line curve $f_a$ in FIG. 2. In this connection, it is taught by the present invention that the filtering unit 5 is interposed between the data terminal unit 6 and the transmission path 4 for the purpose of limiting the spread of the frequency spectrum of the digital signal (pulse signal) outputted from the data terminal unit 6 to, for example, within 10 MHz, as indicated by a broken line curve $f_c$ in FIG. 2, to thereby allow the abovementioned digital signal to be sent onto the transmission path 4 in a base band.

Figure 3:
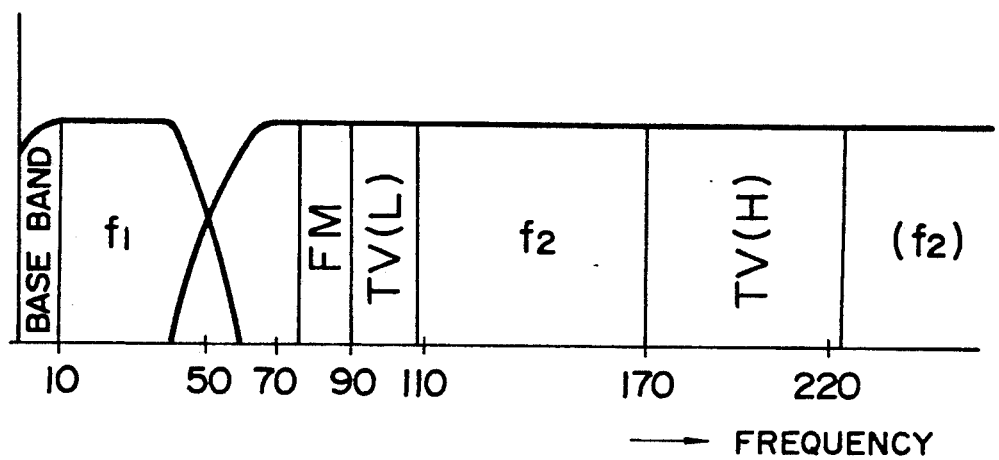
FIG. 3 is a view for illustrating the signal bands handled in the communication network according to the present invention.

FIG. 3 shows relationships between a variety of signals transmitted over the transmission path 4 and frequency bands in the network shown in FIG. 1. In the case of the illustrated example, a frequency band of 0 to 10 MHz is allocated to the base band signal (represented by $f_c$ in FIG. 2) which is processed by the data terminal units 6A and 6B, while a frequency band of 76 to 90 MHz is allocated to a FM signal for the TV 10, and a frequency band of 90 to 108 MHz is allocated to low-frequency channels (first to third channels) of the TV 10 with a frequency band of 170 to 222 MHz being allocated to high-frequency channels (fourth to twelfth channels) of the TV 10. Further, a frequency band of 10 to 50 MHz is allocated to the broad band signal $f_1$ of the up-going direction outputted by the work station 9, while a frequency band of 108 to 170 MHz or higher than 222 MHz is allocated to the down-going broad band signal $f_2$.

Figure 4:
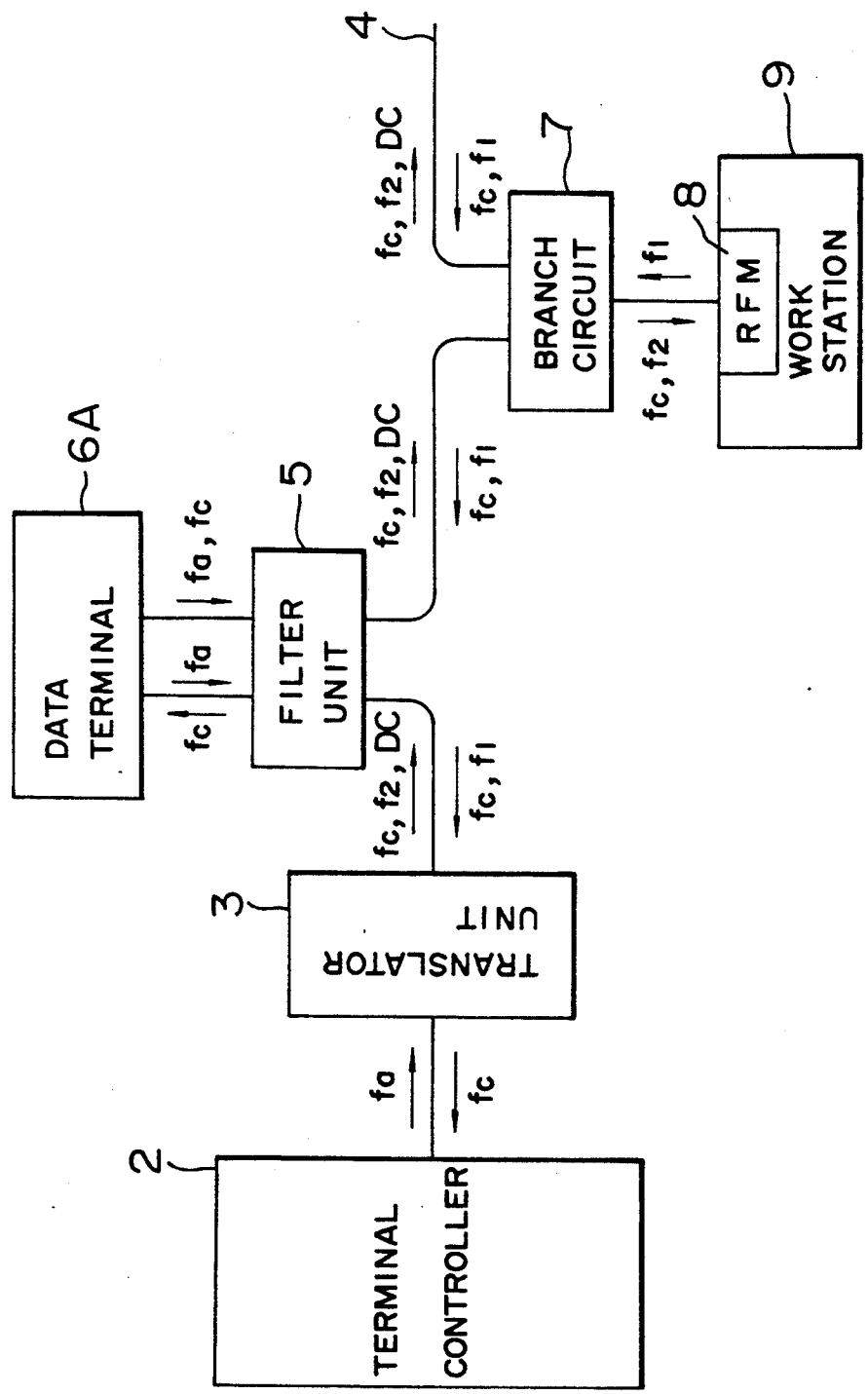
FIG. 4 is a view for illustrating transmission states of various signals on the communication network according to the present invention.

FIG. 4 is a view illustrating signal transfers among the major units of the network shown in FIG. 1 by using frequency symbols defined above. The data to be sent to the destination data terminal unit 6A from the computer (or LAN) of a higher rank location through the terminal controller (TCE) 2 is in the form of the base band signal $f_a$ having a broad frequency spectrum (FIG. 2) at the time point the data is outputted from the TCE 2. High frequency components of this base band signal $f_a$ are cut off by a low-pass filter (LPF) incorporated in the translator unit 3, as described hereinafter, whereby the resulting base signal $f_c$ is sent onto the transmission path 4 to be inputted to the data terminal unit 6A through the filtering unit 5. On the other hand, data sent out by the data terminal unit 6A toward the TCE 2 is in the form of the base band signal $f_a$ having a broad frequency band. High frequency components of this signal $f_a$ are also cut off by the filtering unit 5 to be subsequently sent out onto the transmission path 4 as the base band signal $f_c$, which is then supplied to the TCE 2 through the translator unit 3. When a plurality of data terminals 6A, 6B and so forth are provided on the network, the TCE 2 accepts sequentially data transmission requests of these data terminals by resorting to polling procedure, by way of example. The data issued by the TCE 2 to the destination data terminal unit 6B located in succession to the data terminal 6A is sent onto the transmission path 4 through input/output terminal of the data terminal unit 6A to be supplied to the data terminal unit 6B.

On the other hand, the broad band signal $f_1$ outputted from the work station 9 is sent out onto the transmission path 4 in the up-going direction, i.e. toward the translator unit 3 through the branch circuit 7 to be subsequently translated into the broad band signal $f_2$ by the translator unit 3, whose output signal $f_2$ is sent onto the transmission path 4 in the downgoing direction to be ultimately transmitted to other work stations (not shown). Communication among these work stations may be performed, for example, through CSMA/CD (Carrier Sense Multiple Access with Collision Detection) system known heretofore. The filtering unit 5 incorporates a high-pass filter (HPF) which can pass therethrough the broad band signals $f_1$, $f_2$ as well as the FM signal and video signal for TV (not shown in FIG. 4), as will be described hereinafter by referring to FIG. 6. Further, the filtering unit 5 is implemented in such a structure that can pass a direct current component DC for supplying power to the amplifier 11.

Figure 5:
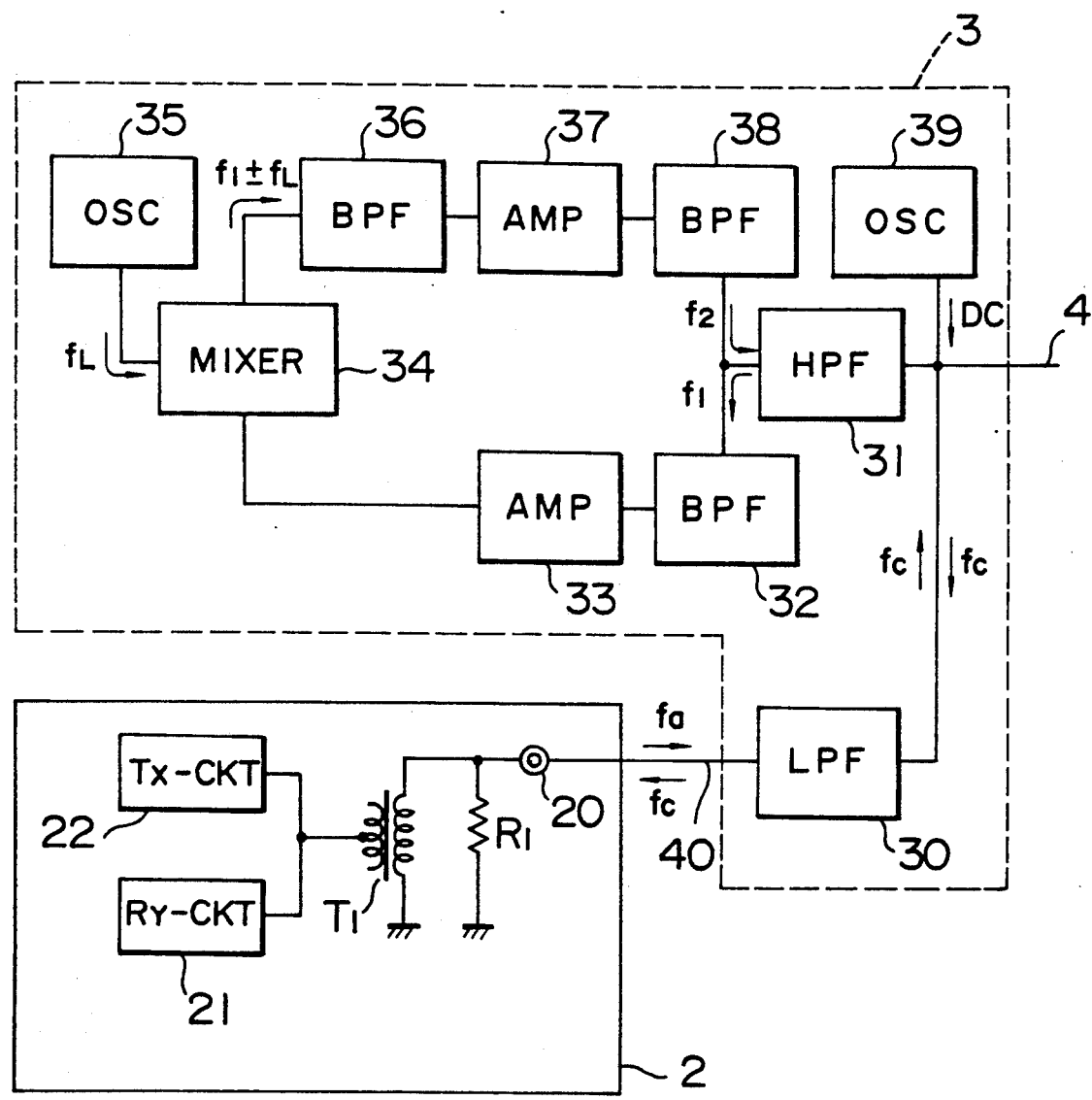
FIG. 5 is a block diagram showing in detail a structure of a translator unit (3) employed in the network shown in FIG. 1.

FIG. 5 shows in a block diagram a structure of the translator unit 3 in detail. The translator unit 3 has inputs supplied with the base band signal $f_c$ and the broad band signal $f_1$ from the transmission path 4. Of these input signals, the base band signal $f_c$ is supplied to the connecting terminal 20 of the terminal controller (TCE) by way of a low-pass filter 30 capable of passing the signal of frequency not higher than 10 MHz and the transmission path 40. The connecting terminal 20 mentioned above is connected to a receiver circuit 21 and a transmitter circuit 22 of the terminal controller 2 through a transformer $T_1$. A reference symbol $R_1$ denotes a terminating resistor of the transmission path and has a resistance value, for example, of 75Ω.

The broad band signal $f_1$ inputted to the translator unit 3 is applied to a mixer 34 through a high-pass filter (HPF) 31 capable of passing the signal of frequency higher than 10 MHz, a band pass filter (BPF) 32 for passing only the up-going signal $f_1$, and an amplifier 33.

The mixer 34 mixes the up-going signal $f_1$ with a frequency $f_L$ supplied from a local oscillator 35 to thereby produce signals of frequencies $(f_1 \pm f_L)$ of which either the signal $(f_1 + f_L)$ or $(f_1 - f_L)$ is selected as the down-going signal $f_2$ by a band pass filter 36 to be sent onto the transmission path 4 through an amplifier 37, a band pass filter 38 and the high-pass filter 31. A reference numeral 39 denotes an oscillator circuit designed to generate a direct current component DC (e.g. of 35 V and 50 Hz) for power supply. This DC component is converted to a DC power in the amplifier (FIG. 1) to be utilized as a drive power for the circuit elements constituting the amplifier.

Figure 6:
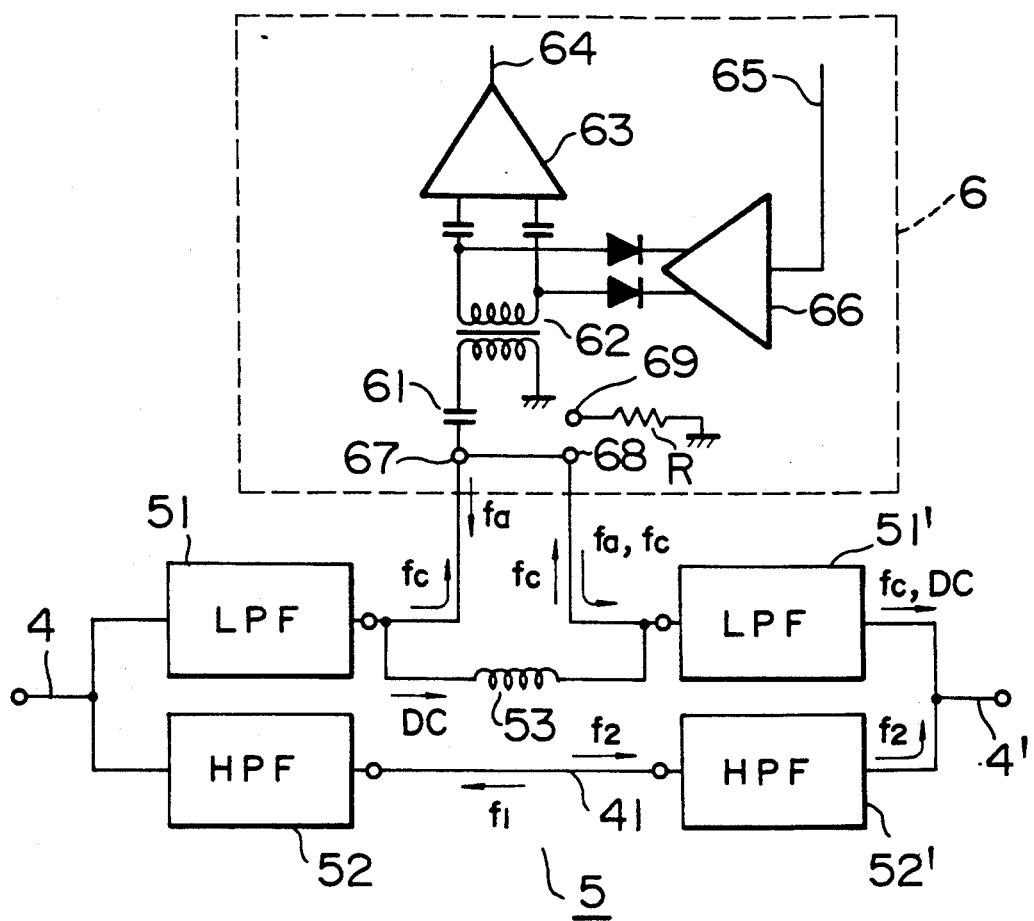
FIG. 6 is a view showing in detail signal input/output portions of a filtering unit (5) and a data terminal unit (6) employed in the network shown in FIG. 1.

FIG. 6 is a view showing a structure of the filtering unit 5 and a connection between the filtering unit 5 and the data terminal unit 6. In the case of the illustrated example, a parallel connection of a low-pass filter (LPF) 51 and a high-pass filter (HPF) 52 is connected to the transmission path on the side upstream of the data terminal 6, while a parallel connection of an LPF 51' and an HPF 52' is connected to the transmission path on the side downstream. The other terminals of the LPFs 51 and 51' are connected to each other through a choke coil 53 and additionally to the connecting terminals 67 and 68, respectively, of the data terminal unit, the connecting terminals 67 and 68 being shortcircuited. The LPFs 51 and 51' are designed to cut off the frequency components higher than 10 MHz. Consequently, only the base band signal $f_c$ and the DC component of the signals on the transmission path 4 can pass through the LPF 51, wherein the DC component is transmitted to the downstream transmission path 4' through the choke coil 53 and the LPF 51', while the base band signal $f_c$ is applied to the connecting terminal 67 to be sent out onto the downstream transmission path 4' through the connecting terminal 68 and the LPF 51'. In the data terminal unit 6, the signal inputted to the connecting terminal 67 is caught by an input signal line 64 through a capacitor 61, a transformer 62 and an amplifier 63. On the other hand, the base band signal $f_a$ to be outputted onto the transmission path 4 from the data terminal unit 6 is produced at the connecting terminal 67 through an output line 65, an amplifier 66 and the transformer 62, whereupon the signal $f_c$ consisting of the frequency components not higher than 10 MHz of the base band signal $f_a$ is sent out onto the transmission paths 4 and 4' through the LPFs 51 and 51'. In case a plurality of data terminal units 6A, 6B, ..., 6N are connected to the transmission path, the connecting terminal 67 of the data terminal unit 6N which is located remotest from the terminal control unit 2 is connected to the connecting terminal 69 having a terminating resistor R ($=75\Omega$) instead of being connected to the connecting terminal 68.

Figure 7:
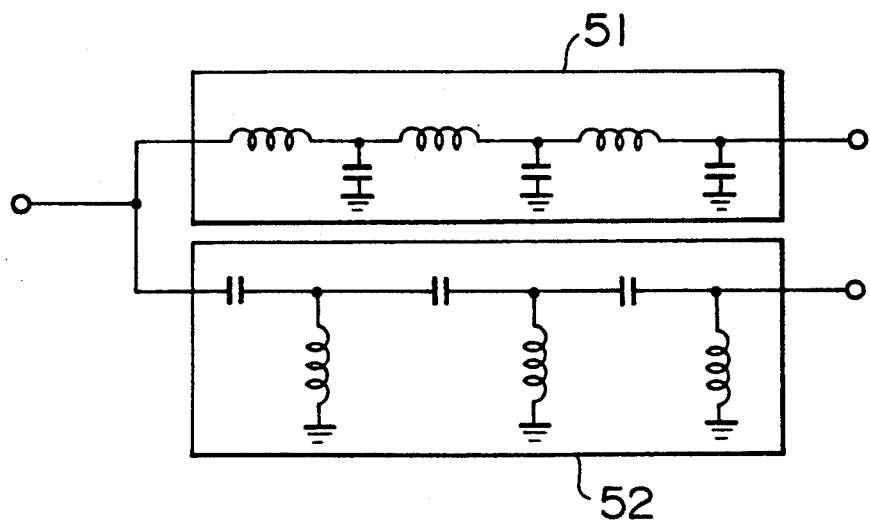
FIG. 7 is a view showing an exemplary embodiment of the filtering unit (6) employed in the network shown in FIG. 1.

The high-pass filters or HPFs 52 and 52' are provided for allowing the broad band signals $f_1$, $f_2$ and FM and the video signal having frequency component higher than 10 MHz to pass therethrough without undergoing influence such as signal reflection possibly occurring due to insertion of the LPFs 51 and 51' in the transmission path. To this end, the HPFs 52 and 52' are connected in series to each other by an internal transmission line 41. The LPF 51 and HPF 52 may be realized in one of various circuit configurations known heretofore, a typical one of which is illustrated in detail in FIG. 7.

Figure 8:
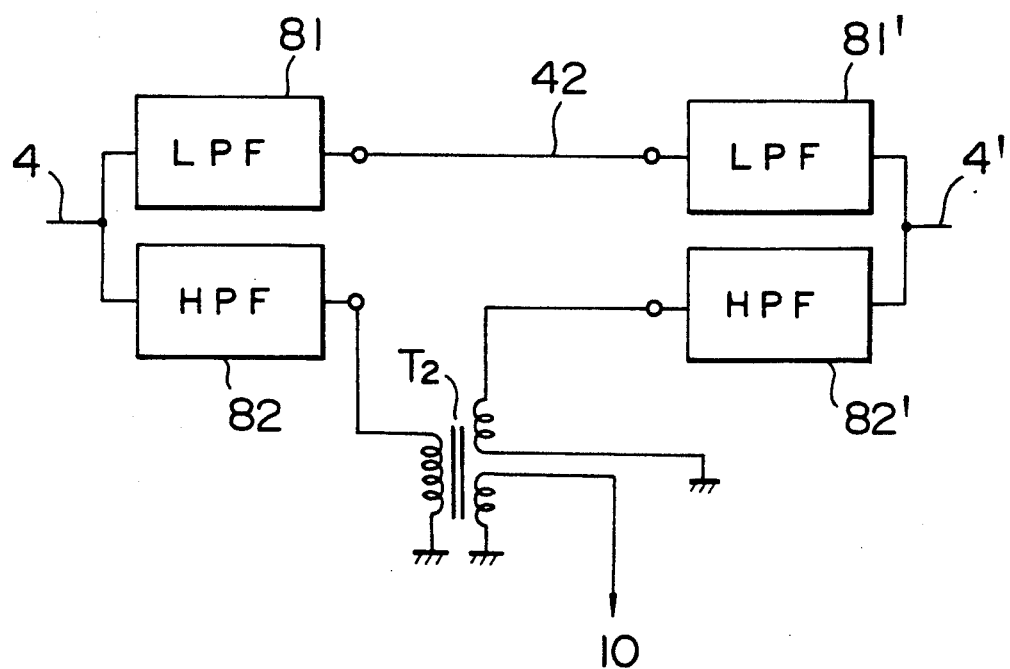
FIG. 8 is a view showing in detail a structure of a branch circuit (8) employed in the network shown in FIG. 1.

FIG. 8 is a view showing a circuit arrangement of the branch circuit 8 used for interconnecting the transmission path 4 and the TV 10 to each other. The branch circuit 8 includes two pairs of parallel connections of filters connected to the upstream transmission path 4 and the downstream transmission path 4', respectively, as in the case of the filtering unit 5. More specifically, the LPFs 81 and 81' are connected in series to each other by an internal transmission line 42 to allow the base band signal to pass therethrough. On the other hand, a transformer $T_2$ is interposed between the HPFs 82 and 82', whereby the signal branch to the TV 10 is realized by the transformer $T_2$.

As will be appreciated from the foregoing description, in the communication system according to the present invention, the frequency band of the signal on the transmission path is divided into a broad band region and a base band region, wherein in the broad band region, frequency-modulated signals are used so that a plurality of the terminal units can communicate with one another in the respective allocated frequency bands, while in the base band region, a plurality of data terminal units can output the data directly onto the transmission path in the form of the pulse signal without resorting to employment of the means for frequency modulation. In the case of the illustrative embodiment, it has been assumed that the base band region is set to the frequency range not higher than 10 MHz. It should, however, be appreciated that the frequency range to be allocated to the base band region is determined in dependence on the data transmission rate required by the data terminal units 6, wherein the cut-off frequencies of the LPFs 51 and 51' are set higher as the data transmission rate is increased.

We claim:

1. A communication system comprising:
   a transmission path;
   a plurality of first terminal units having means for outputting a corresponding base band signal having frequency components within a base band signal range
   a plurality of branch filter means, each being provided for an associated one of said first terminal units, each having a first port, a second port, third port, and a low pass filter means, having a predetermined cut-off frequency, connecting said first port to said second port and connecting said third port to said second port, said associated one of the said first terminal units being connected to said second port, for preventing communication to said transmission path of frequency components of said base band signal above said predetermined cut-off frequency outputted from said associated one of said first terminal units, and said branch filter means having a high pass filter means, within said transmission path, having a lower cut-off frequency above said low pas filter cut-off frequency, connecting said first port to said third port for passing a broad band signal, said broad band signal having a range extending upwards from said lower cut-off frequency, through said transmission path from said first port to said third port;
   a plurality of second terminal units each having means for sending out a first modulated signal having a first frequency range and means for receiving a second modulated signal having a second frequency range, said first and second frequency ranges being higher than the cut-off frequency of said lowpass filter means, a part of a lower one of said first and second frequency ranges being overlapped with the higher frequency components of said base band signal cut off by said lowpass filter means; and
   a plurality branch connecting means, each being provided for an associated one of said second terminal units, for connecting said associated one of said second terminal units to said transmission path.

2. A communication system according to claim 1, further comprising:

means connected to one end of said transmission path for translating the first modulated signal sent out by one of said second terminal units into said second modulated signal to send back said second signal onto said transmission path.

3. A communication system according to claim 2, further comprising:

data processing means connected to said transmission path through said signal translating means for communicating with said first terminal units by using the substantially full range of said base band signal;

said signal translating means including low-pass filter means for cutting off high frequency components of the base band signal supplied from said data processing means at said predetermined cut-off frequency before said base band signal is transmitted to said transmission path.

4. A communication system according to claim 1, further comprising:

means connected to said transmission path, for sending out thereon TV signals having a third frequency range covering a higher one of said first and second frequency ranges of said broad band signal;

a plurality of TV receivers for receiving said TV signals; and a plurality of branching means, each being provided for an associated one of said TV receivers, for connecting said associated one of said TV receivers to said transmission path, but passing the cut-off base band signal through said transmission path.

5. A communication system according to claim 4, wherein said cut-off frequency and said first and third frequency ranges are about 10 MHz, about 10–50 MHz and 50–450 MHz, respectively.

6. A communication system according to claim 1, wherein said cut-off frequency is about 10 MHz.

7. A broad band communication system comprising:

a plurality of information devices for performing broad band communication with each other connected to a transmission path along which modulated signals having a plurality of mutually different frequency ranges, each of said frequency ranges being previously allocated according to kinds of said information devices;

a plurality of data processing units for performing base band communication with each other, each having means for outputting digital data in the form of a base band signal having a frequency range, a higher part of which is overlapped with one of said frequency ranges of said modulated signals; and a plurality of branch connecting means, each being provided for an associated one of said data processing units for connecting the associated data processing unit to said transmissional path, each of said branch connecting means including filter means for limiting the frequency range of the base band signal communicated between said associated data processing unit and said transmission path as being within a range outside of the frequency ranges of the broad band signal used by said information devices.

8. A communication network comprising:

a transmission path;

a plurality of first data processing units for performing base band communication with each other by outputting digital data onto said transmission path in the form of a base band signal, branch connecting means provided between each of said first data processing units and said transmission path for limiting the frequency range of said base band signal inputted/outputted to/from said first data processing unit to a frequency range not higher than a predetermined cut-off frequency, but passing the broad band signal through said transmission path; and a plurality of second data processing units for performing broad band communication by outputting data to be transmitted onto said transmission path after modulation to a predetermined frequency range which is higher than said cutoff frequency.

whereby both said base band communication and said broad band communication are performed individually on said transmission path.

* * * * *